July 1, 1930. J. G. BENNETT 1,769,411
PULLEY BLOCK
Filed June 26, 1928 3 Sheets-Sheet 1
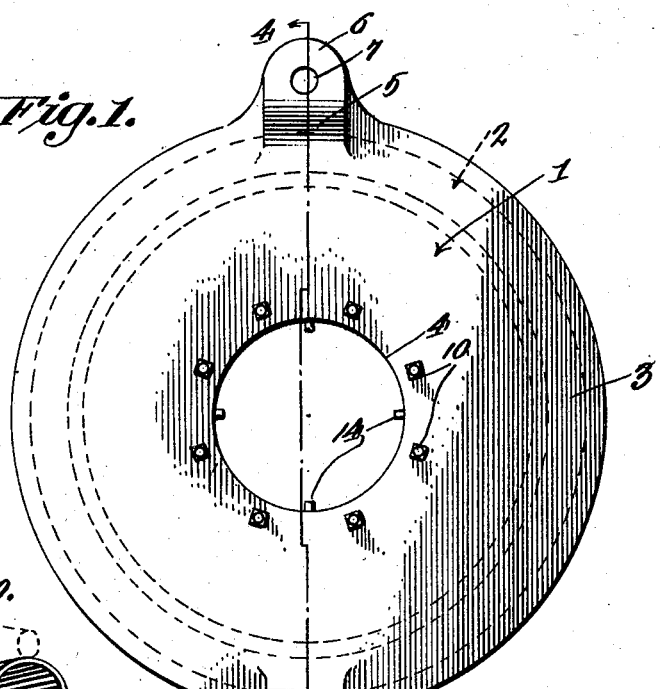
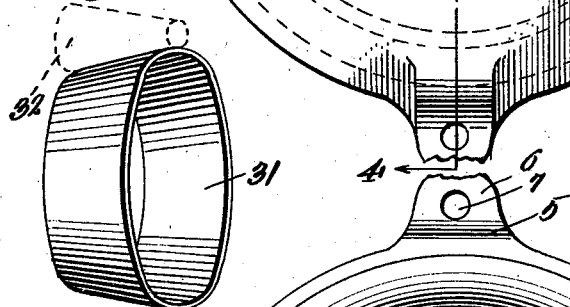
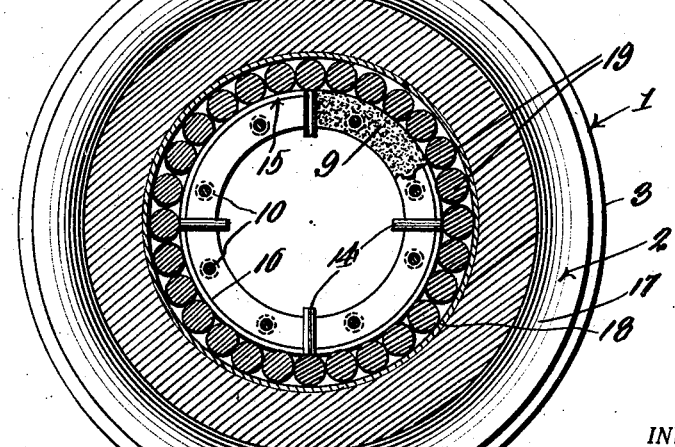
INVENTOR.
JAMES G. BENNETT July 1, 1930.                J. G. BENNETT                1,769,411
                              PULLEY BLOCK
                          Filed June 26, 1928         3 Sheets-Sheet 2
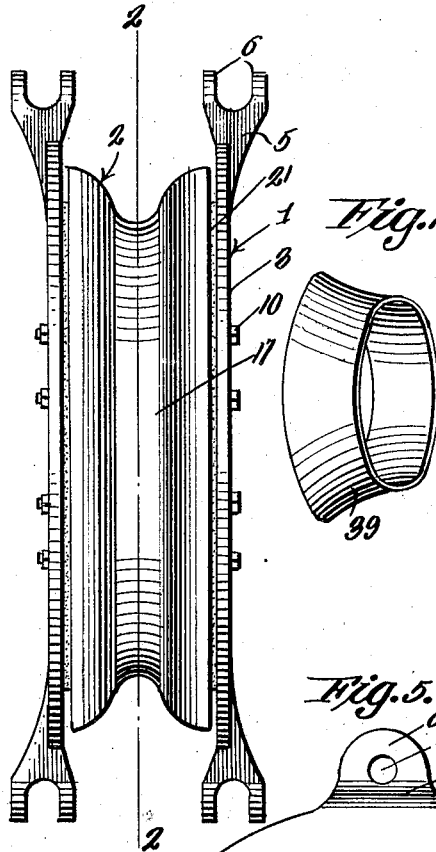
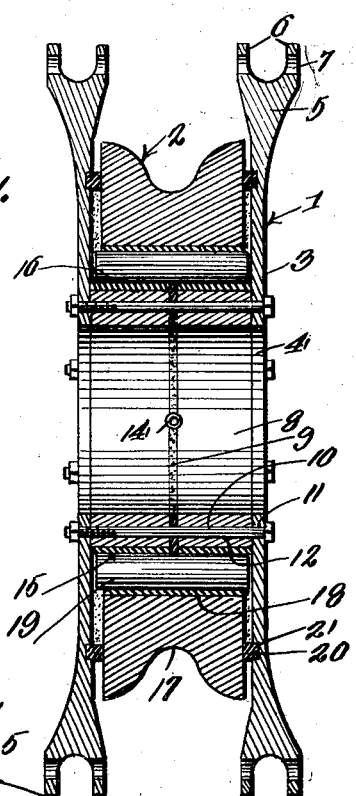
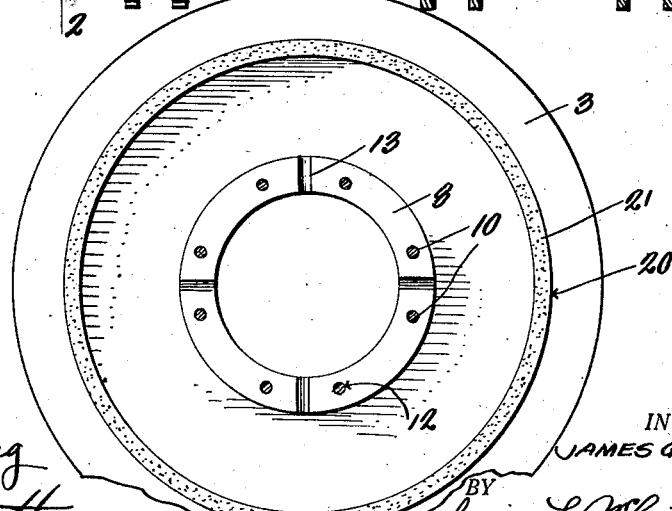
INVENTOR.
JAMES G. BENNETT
BY
ATTORNEY.

July 1, 1930.  J. G. BENNETT  1,769,411
PULLEY BLOCK
Filed June 26, 1928   3 Sheets-Sheet 3

WITNESSES

INVENTOR.
JAMES G. BENNETT
BY
ATTORNEY.

Patented July 1, 1930

1,769,411

UNITED STATES PATENT OFFICE

JAMES G. BENNETT, OF SNOQUALMIE, WASHINGTON

PULLEY BLOCK

Application filed June 26, 1928. Serial No. 288,378.

This invention relates to improvements in pulley blocks and more particularly to that type which are devoid of the usual yoke, spindle supported by the yoke, and sheave rotatable upon the spindle, the invention having as one of its objects to provide a pulley block of such construction that the cable passing over the sheave may have perfect freedom of travel without any likelihood of frictional contact with the parts between which the sheave is mounted and likewise without any likelihood of displacement from the groove of the sheave to become entangled with such parts.

Another object of the invention is to provide a pulley block which will be exceptionally substantial in its construction and in which the sheave will be journaled for free and steady rotation by a bearing construction which is of such nature that the parts thereof may be readily disassembled and replaced, as occasion may require.

Another object of the invention is to provide a pulley block of such construction that lubricant may be readily supplied to the anti-friction bearing elements and the associated parts, whenever required, without any likelihood of splashing of the lubricant and also without any likelihood of its reaching the grooved periphery of the sheave or the cable which is passed thereover, and in this connection the invention also contemplates so constructing the anti-friction bearing assemblage for the sheave that lubricant may be supplied to the same while the sheave is rotating, so that the parts may be lubricated without in any way interfering with the operation of the sheave and cable trained thereover.

Another object of the invention is to so construct the block that lubricant may be admitted to the space between the opposite sides of the sheave and the members which comprise the shell of the block thus obviating frictional contact between the surface of these parts to an extent which might tend to retard the rotation of the sheave, the construction however being such that there is no likelihood of any lubricant escaping from this space and reaching the grooved periphery of the sheave and cable trained about the same.

While the accompanying drawings and the description which is to follow, constitute a disclosure of the preferred embodiment of the invention, it will be understood that various changes may be made within the scope of what is claimed.

In the accompanying drawings:

Figure 1 is a view in side elevation of one form of pulley block embodying the invention.

Figure 2 is a vertical sectional view taken substantially on the line 2—2 of Figure 3.

Figure 3 is a view in front elevation of the pulley block.

Figure 4 is a vertical diametric sectional view taken substantially on the line 4—4 of Figure 1 looking in the direction indicated by the arrows.

Figure 5 is a view in elevation of one of the side members of the shell separated from the remainder of the structure.

Figure 10 is a perspective view, in detail, of a section of a bushing which constitutes a part of the bearing assemblage of the embodiment shown in Figure 6 of the drawings.

Figure 11 is a view similar to Figure 10 illustrating a section of the bushing shown in Figure 7 of the drawing.

Figure 6:
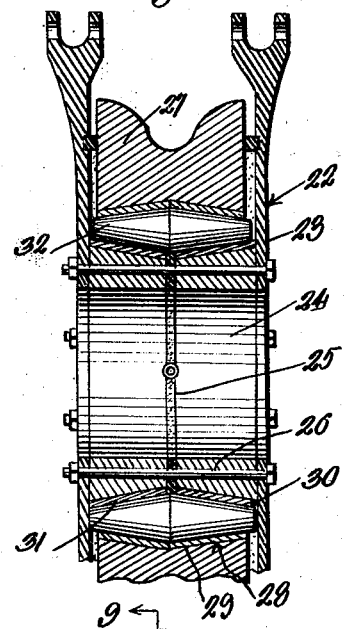
Figure 6 is a fragmentary sectional view similar to Figure 4 illustrating a slight modification of the invention.

In the embodiment of the invention shown in Figures 1 to 5 inclusive, the shell of the pulley block is indicated in general by the numeral 1 and the sheave by the numeral 2, and the said shell 1 consists of a pair of flat circular heads 3 which may be cast, drop forged, or pressed, and, for a purpose which will presently be made apparent, each of the heads 3 of the shell is formed centrally with a circular opening 4. In order that the pulley block may be suspended or otherwise mounted or supported, each head 3 is formed at diametrically opposite points with a thickened boss 5 provided with spaced ears 6 having alined openings 7, and in the assembled relation of the heads 3 of the shell 1, clevises or shackles may be connected thereto, for the purpose stated.

The shell of the pulley block, embodying the invention, further comprises a hub which, in this embodiment of the invention, consists of a pair of cylindrical sections 8 the internal diameter of which is the same as the diameter of the openings 4 in the heads 3, the sections 8 of the hub, in this embodiment, being both interiorly and exteriorly cylindrical. In assembling the sections 8 of the hub with the heads 3 of the shell, each section 8 is disposed endwise against the inner face of a respective one of the heads 3, with the bore of the section 8 registering with the opening 4 in the respective head 3, and a packing gasket 9 is interposed between the other end of the said sections and bolts 10 are fitted through openings 11 and 12 formed respectively in the heads 3 and hub sections 8 and the parts are in this manner secured in their assembled relation.

In order that lubricant may be supplied to the bearing assemblage which, as will presently be described, is arranged about the hub and between the heads 3 of the shell, the ends of the hub sections 8 which are relatively adjacent to each other, are formed with radial grooves or recesses 13 which are preferably equi-distantly spaced, and short tubular spouts 14 are disposed within these recesses and embedded, preferably, in the packing gasket 9 and project, at their inner ends, slightly inwardly beyond the inner surfaces of the hub sections, the outer ends of the spouts 14 being likewise extended a short distance beyond the outer surfaces of the said hub sections 8.

The anti-friction bearing assemblage heretofore referred to includes a bushing which surrounds the hub of the shell and which is indicated in general by the numeral 15, and as illustrated in the drawings and more clearly in Figures 2 and 4, the bushing comprises a pair of hollow cylindrical sections 16 which are preferably of hardened bearing metal and which are interiorly of a diameter to adapt them to be firmly fitted each onto a respective section 8 of the hub, the bushing sections being of the same length dimension as the hub sections 8 so that their ends will be in registration. It will be observed by reference to Figure 4 that the outer edge of the packing ring 9 projects between the inner ends of the bushing sections as do also the outer ends of the lubricant spouts 14, these ends of the spouts terminating flush with the outer surfaces of the bushing sections, 16. As will also be observed by reference to Figure 4, the outer ends of the bushing sections 16 abut the inner surfaces of the heads 3 of the shell 1 and therefore the bushing sections are firmly held against any displacement. The sheave 2 is of angular form and provided in its outer surface with a circumferential groove 17 in which the cable which is trained over the pulley block may travel, and the said sheave 2 is interiorly of a diameter somewhat greater than the diameter of the hub sections 8 of the shell, and as shown in Figures 2 and 4 of the drawings a hollow cylindrical bushing 18 is arranged within the said sheave 2. Cylindrical roller bearings 19 are arranged in an annular series between the bushing 15 comprising the sections 16, and the said bushing 18, and it will be observed that the said bushing 18 is of such dimensions that its ends will register with the opposite side faces of the sheave 2 and that the said sheave is slightly spaced at its opposite outer faces from the inner faces of the heads 3 of the shell 1.

From the foregoing description of this embodiment of the invention it will be evident that lubricant may be supplied to the anti-friction bearing rollers 19 and to the surfaces of the bushings 15 and 18, from an ordinary oil can, by way of any one or more of the spouts 14, and in order that the lubricant may be retained or confined within the spaces between the inner surfaces of the heads 3 of the shell 1 and the outer faces of the sheave 2, an annular groove 20 is formed in the inner face of each head 3 of the shell concentric to and spaced inwardly with respect to the periphery of the sheave 2, and a packing ring 21 is seated in each of these grooves and bears at its outer side against the opposing face or side of the said sheave as clearly shown in Figure 4 of the drawings.

In the embodiment just described, the invention contemplates the employment of cylindrical roller bearings, but Figure 6 of the drawings illustrates a modification of the invention adapted for the employment of roller bearings of a slightly different contour. In this figure the shell is indicated in general by the numeral 22 and comprises a pair of heads 23 corresponding to the heads 3 of the previously described embodiment. The hub, in this embodiment, comprises a pair of sections 24 which are interiorly cylindrical and exteriorly of frusto-conical contour, the sections being assembled between the heads 23 in the same manner that the sections 8 of the hub are assembled between the heads 3 of the shell 1 in the previously described embodiment, it being observed by reference to Figure 6 that the major ends of the sections 24 are disposed against the inner faces of the respective heads 23 and that a packing washer 25 is interposed between the minor ends of the said hub sections, bolts 26 being fitted through openings in the heads 23 of the shell and through the sections of the hub and also through similar openings in the said packing ring 25.

In this embodiment, the sheave, which is indicated by the numeral 27, does not differ from the sheave of the previously described embodiment except that instead of being interiorly cylindrical, its inner surface is of double-conical form, and in this embodiment the bushing 28 comprising a pair of hollow frusto-conical sections 29 is arranged within the sheave 27, the major ends of the sections 29 being disposed in mutually abutting relation as shown in Figure 6. The anti-friction bearing assemblage further includes a bushing 30 which comprises a pair of hollow frusto-conical sections 31 which are disposed to surround the sections 24 of the hub and which abut at their outer ends against the inner faces of the heads 23 of the shell 22 and at their inner or relatively adjacent ends engage against opposite sides of the outer periphery of the packing ring 25. In this embodiment of the invention the anti-friction bearing elements are indicated by the numeral 32 and are of double-conical form, being of maximum diameter midway between their ends and uniformly tapering so as to adapt them to be arranged in an annular series between the bushings 28 and 30. With reference to this embodiment of the invention it will be evident that the contour of the anti-friction bearing elements is such as to insure of true rotation of the sheave 27.

Figure 7:
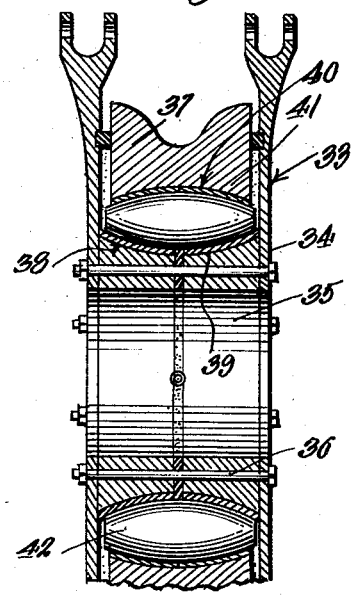
Figure 7 is a view similar to Figure 6 illustrating a further modification of the invention.

The embodiment of the invention shown in Figure 7 of the drawings is similar to the embodiment shown in Figure 6, the shell, which is indicated in general by the numeral 33, comprising a pair of heads 34 which correspond to the heads 23 and a hub 35 which comprises a pair of sections corresponding to the sections 24. In this embodiment however the hub sections 35 are interiorly cylindrical but exteriorly transversely concave so that the hub sections are approximately of frusto-conical form at their exterior surfaces. In this embodiment, as shown in Figure 7, the hub sections 35 are assembled with each other and with the heads of the shell 33, in the same manner as are the hub sections 24 of the embodiment shown in Figure 6, and the parts are held in their assembled relation by means of bolts 36. The sheave is indicated by the numerals 37 and is arranged concentric to the hub and, as shown in Figure 7, a bushing 38 comprising a pair of hollow approximately frusto-conical sections 39 is arranged with each of its sections encompassing a respective one of the hub sections 35, a similar bushing, indicated in general by the numeral 40, being provided in connection with the sheave 37 and comprising a pair of sections 41 which are of hollow form and of a contour to adapt their outer sides to snugly conform to the contour of the inner periphery of the sheave 37. Anti-friction bearing elements 42 are arranged in an annular series about the hub and between the same and the sheave and these bearing elements are preferably of the ovate form shown in Figure 7, being uniformly curved from end to end and circumferentially and of maximum diameter at a point midway between their ends, the curvature of the surfaces of the bearing elements conforming substantially to the curvature of the surfaces of the bushing sections between which they are confined.

Figure 8:
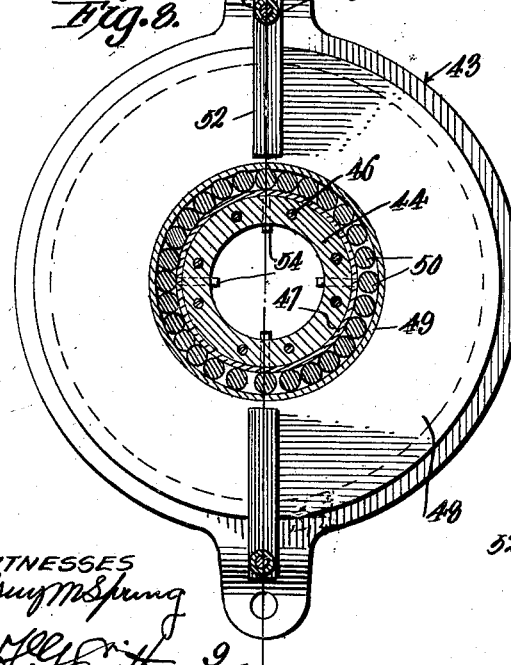
Figure 8 is a vertical sectional view through a multiple sheave pulley block embodying the invention.
Figure 9:
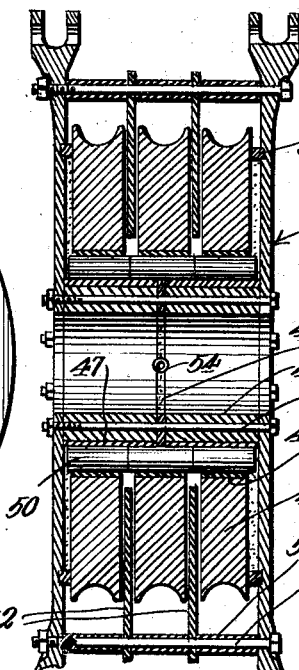
Figure 9 is a vertical diametric sectional view taken substantially on the line 9—9 of Figure 8 looking in the direction indicated by the arrows.

The embodiments of the invention previously described are obviously designed to accommodate a single stretch of cable, inasmuch as each embodies but a single sheave, but Figures 8 and 9 of the drawings illustrate a modification of the invention in which any number of sheaves may be embodied depending upon the number of cables to be handled. In these figures the shell is indicated by the numeral 43 and is of substantially the same construction as the shells of the previously described forms, and a hub comprising sections 44 of hollow cylindrical form, is arranged between the heads and a packing washer 45 is arranged between the inner or relatively adjacent ends of the hub sections, bolts 46 being secured through the hub sections, the heads of the shell 43, and the packing washer 45. A bushing comprising hollow cylindrical sections 47 is arranged to embrace the hub comprising the sections 44 and is arranged in the same manner as the corresponding bushing of the embodiment shown in Figure 4 of the drawings. In this embodiment three sheaves 48 are mounted within the shell for rotation about the hub and each sheave is provided with a hollow cylindrical bushing 49 which fits in an opening formed centrally within the sheave, roller bearings 50 being arranged in three annular series between the bushings 47 and 49.

In order to prevent longitudinal displacement of the sheaves 48 with respect to the hub of the shell of the pulley block, bolts 51 are secured at their ends in openings provided in the heads of the shell 43 near the outer peripheries thereof, and combined spacing and guide fingers 52 are mounted at their outer ends upon the bolts 51 and project radially inwardly and each between a pair of the sheaves 48, spacing sleeves 53 being mounted upon the bolts 51 between the said ends of the fingers 52 so as to maintain the members 52 in proper position to extend between the sheaves 48 and maintain the sheaves against displacement. In this embodiment of the invention, oil spouts 54 are provided and correspond to the spouts 14 of the first described embodiment, and likewise, in order to prevent the escape of lubricant between the heads of the shell and the faces of the sheaves, packing rings 55 are arranged in annular grooves in the inner faces of the heads of the shell and are in contact with the adjacent sides or faces of the endmost ones of the series of sheaves.

Having thus described the invention, what I claim is:

1. A pulley block comprising a pair of spaced frame plates having enlarged central openings, a hollow hub including a pair of annular sections placed end to end between the frame plates and having their outer ends abutting the inner faces of the frame plates and surrounding the openings therein, the bore of the hollow hub registering with the openings in the frame plates, a sheave between the plates and concentrically surrounding the hub, anti-friction bearing elements arranged in an annular series between the hub and sheave, an annular washer disposed between the adjacent ends of the hub sections, oil filling spouts imbedded in the washer and extending into the bore of the hub whereby the same will be accessible from within the hub for conducting lubricant to the space between the hub and said sheave, and fastening members extending through the frame plates, hub sections, and washer.

2. A pulley block comprising a pair of spaced frame plates having enlarged central openings, a hollow hub including a pair of annular sections placed end to end between the frame plates and having the outer ends abutting the inner faces of the frame plates and surrounding the openings therein, the bore of the hollow hub registering with the openings in the frame plates, a plurality of sheaves between the plates and concentrically surrounding the hub, anti-friction bearing elements arranged in an annular series between the hub and sheaves, fastening members extending through the frame plates and the hub sections, fastening members connecting the frame plates together and extending beyond the peripheries of the sheaves, and inwardly directed guide and spacer arms carried by said last mentioned fastening elements and extending between said sheaves.

In testimony whereof I affix my signature.

JAMES G. BENNETT.